United States Patent
Goebel (10) Patent No.: US 6,939,127 B2
(45) Date of Patent: Sep. 6, 2005

(54) METHOD AND DEVICE FOR ADJUSTING AIR RATIO

(75) Inventor: Peter Goebel, Frankenberg (DE)

(73) Assignee: GVP Gesellschaft zur Vermarktung der Porenbrennertechnik mbH, Erlangen (DE)

(*) Notice: Subject to any disclaimer, the term of this patent is extended or adjusted under 35 U.S.C. 154(b) by 0 days.

(21) Appl. No.: 10/472,660

(22) PCT Filed: Mar. 22, 2002

(86) PCT No.: PCT/EP02/03253
§ 371 (c)(1),
(2), (4) Date: Sep. 22, 2003

(87) PCT Pub. No.: WO02/077528
PCT Pub. Date: Oct. 3, 2002

(65) Prior Publication Data
US 2004/0106078 A1 Jun. 3, 2004

(30) Foreign Application Priority Data

Mar. 23, 2001 (DE) .......................... 101 14 405
Mar. 26, 2001 (DE) .......................... 101 41 901

(51) Int. Cl.⁷ ............................................. F23N 3/00
(52) U.S. Cl. .......................................... 431/12; 431/18
(58) Field of Search ..................... 431/12, 18; 374/37

(56) References Cited

U.S. PATENT DOCUMENTS

| 4,359,284 A | * 11/1982 | Kude et al. ............. 374/37 |
| 5,401,162 A | 3/1995 | Bonne |
| 5,486,107 A | 1/1996 | Bonne |
| 6,752,621 B2 | * 6/2004 | Rusche et al. .......... 431/12 |

FOREIGN PATENT DOCUMENTS

| EP | 0 075 369 A1 | 3/1983 |
| EP | 1 002 997 A2 | 5/2000 |

* cited by examiner

Primary Examiner—Alfred Basichas
(74) Attorney, Agent, or Firm—Rankin, Hill, Porter & Clark LLP (57) ABSTRACT

A method for setting an air ratio of a fuel/air mixture made from a gaseous fuel and air for the operation of a burner, including the steps of:
a) determining the mass current of the fuel as a first measured value,
b) determining a value for the determination of the Wobbe index of the fuel as a second measured value,
c) determining a mass current of the air as a third measured value, and
d) controlling the mass current of the air and/or the fuel in dependence on at least two of the measured values so that a specified air ratio $\lambda$ of the fuel/air mixture is set.

32 Claims, 9 Drawing Sheets

METHOD AND DEVICE FOR ADJUSTING AIR RATIO

The invention relates to a method and a device for setting the air ratio λ of a fuel/air mixture made from a gaseous fuel and air for the operation of a burner.

From DE 29 28 739 B1 a method is known during which a partial current from a combustible gas is taken and is guided over a laminar resistance. The drop in pressure over the laminar resistance is measured at constant temperature or with suitable temperature compensation. The measured pressure drop or the viscosity of the gas can be used to determine the Wobbe index or the Wobbe number and therefore the calorific value as well as useful heat of the gas.

From WO 2000/065280 or DE 199 18 901 C1 a device is known for setting of the oxidising agent/fuel mixture in the feeder line of a burner. The viscosity of the oxidising agent/fuel mixture is measured and, depending on the determined measured value, the composition of the oxidising agent/fuel mixture is set. To measure the viscosity, the volume current, the temperature and the pressure of the fuel, among others, are measured. With the suggested method, determination of the viscosity is dependent on many parameters. Due to measuring errors when the individual parameters are measured, determination of the viscosity is sometimes inaccurate. Due to this, the setting of the oxidising agent/fuel mixture is not always optimal.

From DE 43 36 174 it is known that a volume current of a fuel gas is measured for measurement and/or regulation of the amount of heat to be fed to gas-consuming devices. In addition, the speed of sound and the density of the gas are measured under normal conditions as well as the speed of sound under operating conditions. The amount of heat to be fed to, the gas-consuming device is determined from the aforementioned parameters.

The pressure fluctuations carried in from the gas network cannot be determined by the known device. A pressure regulator must be installed in front. The known device is not particularly universal since it only optimises the gas/air mixture to a specified value. In particular, it is not specially considered that a burner must sometimes be operated with different gas/air mixtures depending on selection of a specified operating mode.

The object of the invention is to specify a universal method and a universal device for the setting of the air ratio'of a fuel/air mixture.

This object is solved by the features of claims 1 and 8. Useful embodiments result from the features of claims 2 to 9 and 10 to 32.

The suggested method is particularly universal. The measurement of the mass flow of the fuel as provided by the invention permits pressure fluctuations in the gas network to be detected. Such fluctuations in pressure can be compensated by feedback control with use of the method provided by the invention. The provision of a pressure regulator is no longer necessary. The mass current or mass flow is specified by $$q_m = dm/dt.$$

The mass current or mass flow is constant in a closed system. In contrast to the volume flow, with compressible fluids, the mass flow is not dependent on the density and therefore also not on the pressure and the temperature.

The measurement of the mass flow of the air permits the air ratio to be set to the technical requirements of the type of burner being used. In addition, the air ratio can be set to specified values based on the particular operating mode of the burner, e.g., the ignition process or similar. The suggested method permits at all times stable and safe operation of a wide variety of different burners, even with pressure fluctuations in the gas network or changing gas compositions.

Particularly fluctuating gas compositions have made it necessary that burners be designed in accordance with state of art so that they function correctly over a relatively wide air ratio range. At the same time, such burners have the disadvantage that the combustion is not optimal. Undesired emissions are the result. The method provided by the invention now permits the use of burners which are optimised to a relatively narrow air ratio range. Such burners can be operated with low emission values.

It is advantageous that the control of the mass current of the air takes place in step d in dependence on the measured values, i.e., the first, second and third measured value. Control is then particularly precise. The mass current of the air can be controlled with a blower. The higher the speed of the blower, the greater the amount of air in the fuel/air mixture. The air ratio λ can be increased by increasing the speed of the blower when the added heat value of the fuel per time unit is held primarily constant at the same time.

In optimised arrangement, the measured values are transmitted to a data processing device, processed in accordance with a specified algorithm, and, via the data processing device, the mass current of the fuel is regulated with a dosing valve connected in the fuel flow. The mass current of the air can be controlled with a blower, an air valve and/or a second dosing valve. The data processing device can be a conventional evaluation and control electronics unit equipped with a microprocessor. The dosing valve(s) conveniently can be regulated pneumatically or with an electrical actuating drive.

In a further design feature, the air ratio λ can be controlled in dependence on the stability of a flame created in the burner. A light-sensitive resistor or similar can be provided in the burner, for instance. From this, fourth measured values can be transferred to the data processing device. Based on the fourth measured values and the third measured values, it is not only possible to control the blower, the air valve and/or the second dosing valve, but also to regulate it. Regulation of the blower, the air valve and/or the second dosing valve can also be performed in dependence on a specified heating capacity of the burner. In this case, the fifth measured values of a device for measuring the capacity of the burner are transferred to the data processing device. It is also possible to regulate the air ratio so that emissions generated during combustion are minimal. In this case, a λ-probe, for instance, is installed in the burner which transfers sixth measured values to the data processing device.

The measurement of the viscosity of the fuel permits immediate detection of a change in the composition of the gas. An accompanying change in the Wobbe index or the Wobbe number or the heat value or the calorific value of the fuel can also be regulated and offset.

A partial current can be taken from the fuel current to measure the viscosity. The partial current is pumped with a micro-pump with constant volume current V through a capillary. The temperature of the capillary and the pressure drop are measured via the capillary. The dynamic viscosity can be determined from these measured values and a device constant which, in case of a laminar current present here, is calculated with the Hagen-Poiseuille equation.

It is also possible to measure the dynamic viscosity of the gaseous fuel discontinuously. A gas sample is taken from the fuel current and fed to a piston pump. A piston of the piston pump is moved at a constant speed and thereby displaces the volume through the capillary. In accordance with a first version, a constant volume current V is set for a certain time t and the pressure difference Δp is measured via the capillary. The measurement can either only be performed over the forward or backward way or over both the way forward and way backward. In accordance with a second version, the speed of the piston increases continuously until the pressure difference reaches a certain value at which a measuring error of a pressure sensor is particularly low. At this point in time, the speed is defined and the dynamic viscosity is determined.

A further way to determine the dynamic viscosity is to increase the pressure in a chamber with a micro-pump to a specified pressure $p_0$. A valve is then opened between the capillary and the chamber and the pressure of the chamber is relaxed via the capillary until the pressure equals the pressure in the main current of the fuel. The dynamic viscosity can be determined from the speed at which the pressure decreases via the capillary.

With regard to the fundamentals governing the relationship between the viscosity of gases and the Wobbe index or the Wobbe number, and the heat and calorific value, attention is directed to DE 29 28 739 B1 and WO 2000/065280 whose disclosures are included herewith. The air ratio λ is specified by the following relationship:

$$\lambda = L/L_{Min}$$

wherein L is the actual combustion air quantity from the combustion calculation and $L_{Min}$ is the minimum air requirement.

According to the invention, a device is provided for the performance of the method provided by the invention, wherein a first mass current sensor to determine a first measured value, and a device for the measurement of a second measured value of the viscosity of the fuel or a function of the same and a dosing valve are connected in a feeder line, wherein a second mass current sensor is connected in an air feeder line to determine a third measured value, wherein a means of controlling the mass current of the air is provided, wherein a data processing device for regulation of the mass current of the fuel via the first dosing valve is provided, wherein the mass current of the fuel can be regulated in dependence on the first and the second measured value so that a specified heat value of the required fuel per time unit is primarily held constant, and wherein, via the data processing device, the mass current of the air can be controlled in dependence on at least two of the measured values so that a specified air ratio λ can be set.

The mass current sensors used can be conventional mass current sensors. For instance, hot wire sensors, Karman vortex sensors, and similar are suitable. The device for the measurement of the viscosity of the fuel can also be a conventional device as known, for instance, from DE 29 28 739 or WO 2000/065280. The disclosures of the aforementioned publications are included to this extent. The dosing valve can also be a usual, state-of-the-art, dosing valve which can be regulated pneumatically or electrically.

As applied to the invention, the term "fuel feeder line" can also mean a bypass branching from a main fuel line. In particular, it is possible to use the device to measure the second measured value of the viscosity or a function of same in such a bypass. As applied to the invention, the term "air feeder line" can also mean a bypass of a main air current line. The second mass current sensor can also be provided here in this bypass.

In optimised arrangement, the mass current of the air can be controlled with the data processing device in dependence on the measured values, i.e., the first, second and third measured value. Such control is particularly precise. The mass current of the air can be particularly controlled by the power of a blower, the position of an air valve or an additional dosing valve.

With regard to the further advantageous embodiments, attention is directed to the aforementioned specifications which can also be applied to the device side.

In an advantageous arrangement, a blower with a blower housing and a blower wheel can be provided for air or combustion air in a wall/floor furnace which has an air inlet (suction side) and an air outlet (pressure side) and which is equipped with the fuel feeder line for a preferably gaseous fuel, wherein the second mass current sensor is located on the air inlet as part of the air feeder line, and is functionally connected to the data processing device and this sensor sends signals to this for the conditioning of the ratio of combustion medium/combustion air in dependence on the desired heating capacity.

A device with such a blower is made available which provides and permanently ensures homogenous low-emission combustion to a full mixing surface burner through the acquisition of the air and gas mass current. By combining the blower with a fuel feeder line for the fuel or the gaseous combustion medium, a compact construction unit is provided which significantly reduces installation work when the furnace is manufactured. By acquiring the mass current of the combustion air and the mass current of the combustion medium directly on the air inlet, one obtains the required actual values for control and regulation without interference so that the regulation of the mixture ratio permits a precise setting and low-emission combustion is provided.

This is particularly an advantage when the second mass current sensor is an electronic air mass current anemometer. Such an anemometer has proven useful for various measuring areas and supplies sufficiently precise signals for the determination of the mass current of a gaseous medium.

A particularly optimised arrangement is a ring jet arrangement on the air inlet of the blower on which the second mass current sensor is located. This special arrangement for the site of the second mass current sensor permits interference-free acquisition of the mass current since there is a pseudo laminar current flow at this location and the measured states can be considered homogeneous over the cross section area on the suction side.

It is particularly advantageous when the second mass current sensor is located in a bypass which empties into the gap of the ring jet arrangement. An optimal measuring mass current is fed by this to the second mass current sensor so that the applicable measuring signals result in an error-free determination of the actual mass current in the main current.

With a further embodiment, the ring jet arrangement also has an additional jet gap for the provision of fuel in addition to the jet gap for the air mass measurement. This special formation permits a very homogeneous mixture of the fuel with the combustion air.

It may be favourable that a first mass current sensor is installed in the area of the additional jet gap which sends appropriate signals to the data processing device. This makes it possible to achieve optimal combustion conditions regardless of the fixed values set on the device for the combustion gas.

It can also be an advantage that the ring jet arrangement is an integral part of the housing wall on the air inlet of the blower. It is favourable that the ring jet arrangement surrounds or forms a ring around the main current of the combustion air on the air inlet. This arrangement ensures continuous homogeneous suctioning of the measuring air current through the applicable jet gap.

With a different design form, it may be favourable that an input canal is placed in front of the ring jet arrangement. The bypass can empty into the input canal when a favourable formation is used. However, the bypass can also empty into a ring gap inside the input canal so that a uniform suctioning of the measuring air current is ensured in accordance with the pressure distribution over the cross section.

With an additional design form, it may be favourable that the gas feeder is controlled via a rotary valve/regulator valve that is an integral part of the blower housing. It is advantageous that this rotary valve/regulator valve is designed for the gas feeder on the suction side of the blower. This makes manufacturing efficient.

The formation provided by the invention advantageously lets the electronic motor commutation handle the mass current evaluation and regulate the speed of the blower motor based on the results of the evaluation.

It is particularly advantageous when the electronic motor commutation handles the mass current evaluation and regulates both the speed of the blower motor and the gas feeder.

Examples will now be used to describe the invention in more detail based on the drawings.

Figure 1:
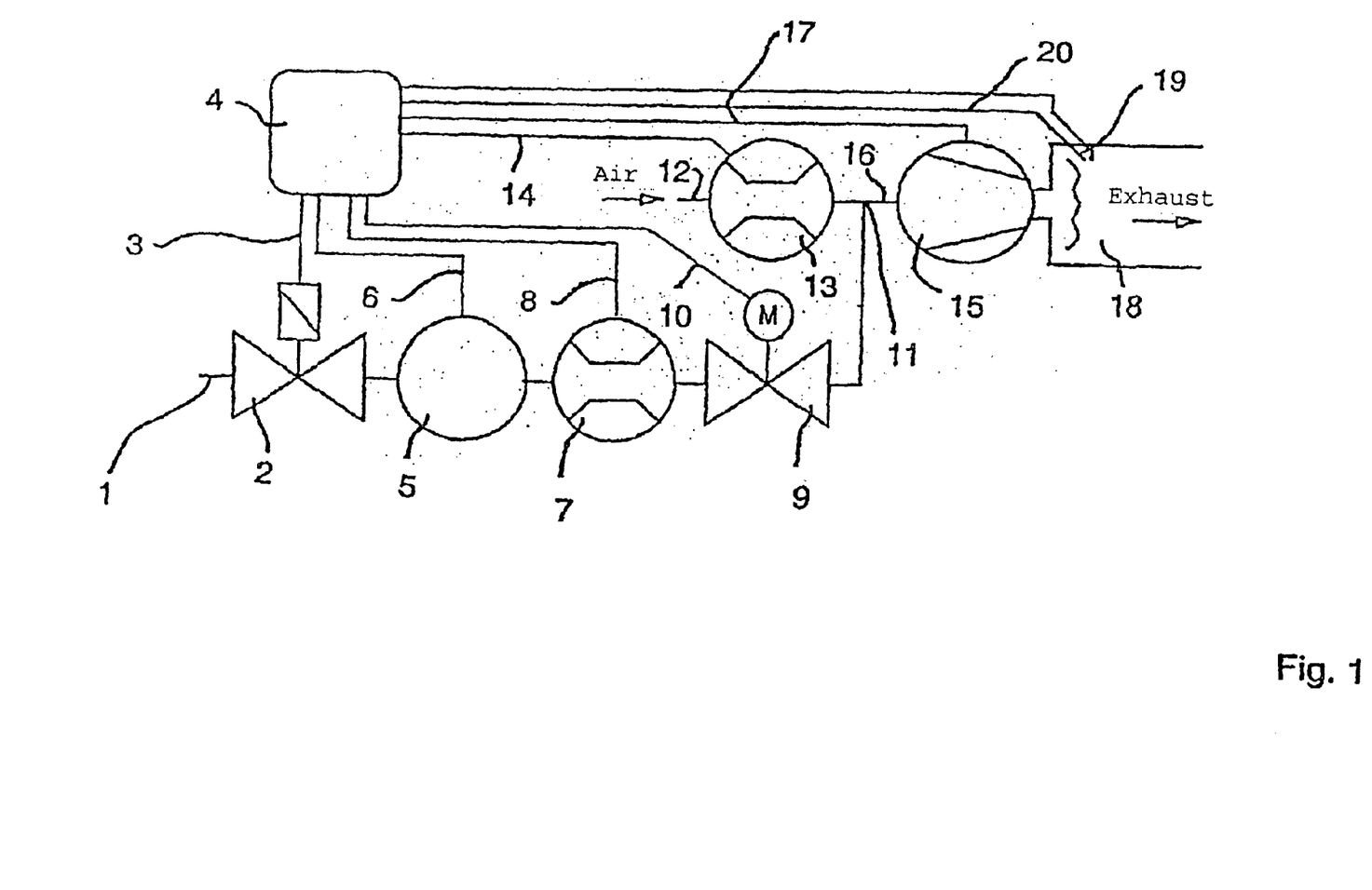
FIG. 1 A block circuit diagram of a device provided by the invention.

In FIG. 1, a safety magnet valve or shutoff valve 2 is connected in a feeder line 1 which is suitable for gaseous fuel or gas. Shutoff valve 2 is connected via a first control line 3 with a data processing device 4. This can be an evaluation and control electronics unit which is equipped with a microprocessor and a permanently stored algorithm for the evaluation of measured data as well as for control. A device 5 downcurrent from shutoff valve 2 for the measurement of the viscosity of the gas has, for instance, a capillary as current resistance (not shown here) through which a partial current taken from the gas current with laminar current is led.

A pressure drop is measured via the capillary with a suitable pressure measuring device (also not shown). The Wobbe index or the Wobbe number, the heat value and calorific value of the gas can be determined from the measured drop in pressure. The pressure measuring device is connected via a first measuring line 6 with the data processing device 4. A first mass current sensor 7 is located after a device 5 for measuring the viscosity of the gas. This can be a conventional hot wire sensor, for example. Hot wire sensors measure the mass current of the gas based on the flying time of a heat signal impressed on the gas current. The first mass current sensor 7 is connected via a second measuring line 8 with the data processing device 4. A first dosing valve 9 is located after the first mass current sensor 7 which first valve is connected with a second control line 10 with the data processing device 4. The gas feeder line 1 empties into an air feeder line 12 at branching point 11. A second mass current sensor 13 is connected in the air feeder line 12 which sensor is connected with a third measuring line with the data processing device 4. A blower is labelled 15 which is connected downcurrent of the branching point 11 in a gas/air mixture line 16. The blower 15 is connected via a third control line 17 with the data processing device 4.

Downcurrent of the blower 15 is a burner 18 with an ignition device 20 which is connected via fourth control lines 19 with the data processing device 4.

The function of the device is described below.

The gas feeder line 1 can be connected directly, i.e., without intermediate connection of a pressure regulator, to the gas network. A leak test can then be performed. The shutoff valve 2 is closed. Using the first mass current sensor 7, it is determined whether the shutoff valve 2 correctly shuts off the gas feeder line 1 tightly. If this is the case, the shutoff valve 2 can be opened by appropriate activation via the first control line 3. Over the distance up to the first dosing valve 9 the viscosity is measured with device 5 and the mass current of the gas is measured with the first mass current sensor 7. The two measured values are transferred to the data processing device 4 and evaluated there with a specified algorithm. Various specified parameters (e.g., the characteristics of the burner 18) are considered. The processing of the measuring results supplied by the device 5 and the first mass current sensor 7 generates control pulses with which the first dosing valve 9 is controlled so that a gas current with a constant heat value per time unit is provided at branching point 11. The first dosing valve 9 can be a pulse, rotary valve or a piezo valve. A deviation of the viscosity or the mass current of the gas causes an immediate change in the cross section of the first dosing valve 9 so that the specified heat value per time unit is always held constant. Every pressure fluctuation of the gas network and every change in the gas composition is detected and offset in a suitable manner.

The mass current of the air is measured using the second mass current sensor 13. The gas/air mixture is determined by the air ratio λ. One of the specified operating states, e.g., ignition of the burner, based on the data processing device 4 is set via suitable control of blower 15. The specified air ratio λ corresponds to the mass current of the fed air when a gas with constant heat value per time unit is fed in. The air ratio λ can therefore be set via the mass current of the air. The mass current of the air can, for instance, be controlled via the power of the blower, i.e., its speed, or via a second dosing valve connected before or after the blower or an air valve (not shown here).

Further, it is possible to regulate the air ratio λ in dependence on further parameters. Suitable sensors can be provided in the area of burner 18 to acquire the stability of the flame, the capacity of burner 18 or the emissions generated by the combustion. Such sensors (not shown here) can be connected via (not shown here) fourth, fifth or sixth measuring lines with the data processing device 4. The air ratio λ can be controlled, for instance, so that a specified stability of the flame is maintained, a certain capacity of burner 18 is held constant, or emission values are kept to a minimum.

The aforementioned example is certainly not to be misinterpreted to mean that the stated components must be arranged in the order described. Naturally, it is possible to also arrange device 5, the first mass current sensor 7 and the dosing valve 9 in a different order. In addition, it is also possible to arrange the second mass current sensor 13 and the blower 14 in a different order and the arrangement with respect to point 11.

Figure 2:
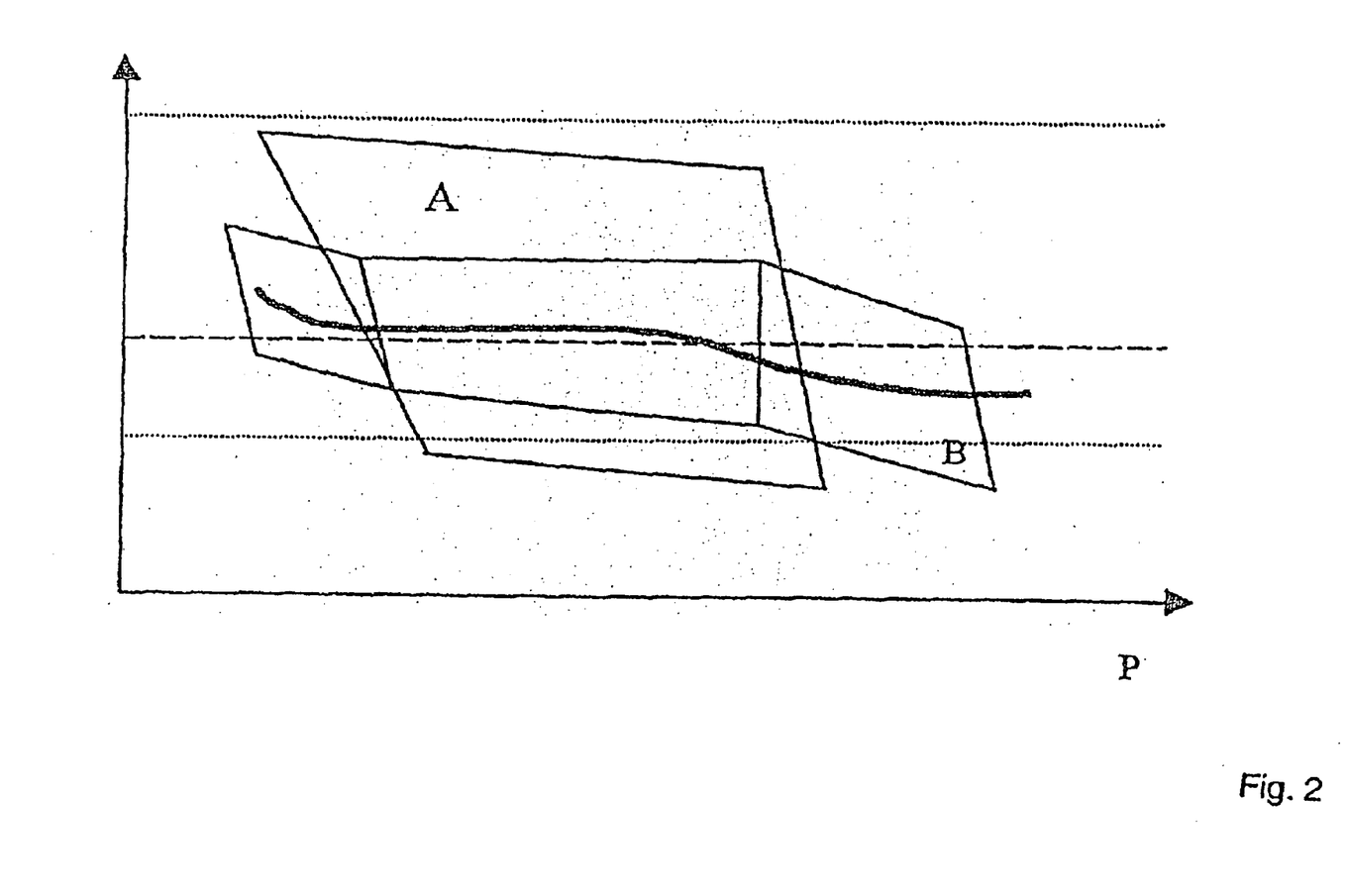
FIG. 2 The air ratio λ shown over the capacity of a burner.

FIG. 2 shows the air ratio λ with the performance P of a burner. The field of operation labelled A is typical for state-of-the-art burners. Due to changes in the types of gas during conventional operation, such burners must ensure safe operation over a relatively wide range of air ratios λ. The applicable performance range P, the so-called modulation, is not particularly wide. When the method provided by the invention or a device suitable for the performance of this method is used, burners can be used which are set for operation in a narrow range of air ratios λ. When the method provided by the invention is used, a change in air ratio λ occurs within specified limits. A random, undesired change in the air ratio λ is not possible. Burners which are set to a relatively narrow operating range with respect to the air ratio λ can be operated with low emission values. They exhibit improved modulation. The field of operation of such burners is labelled B in FIG. 2.

Figure 3:
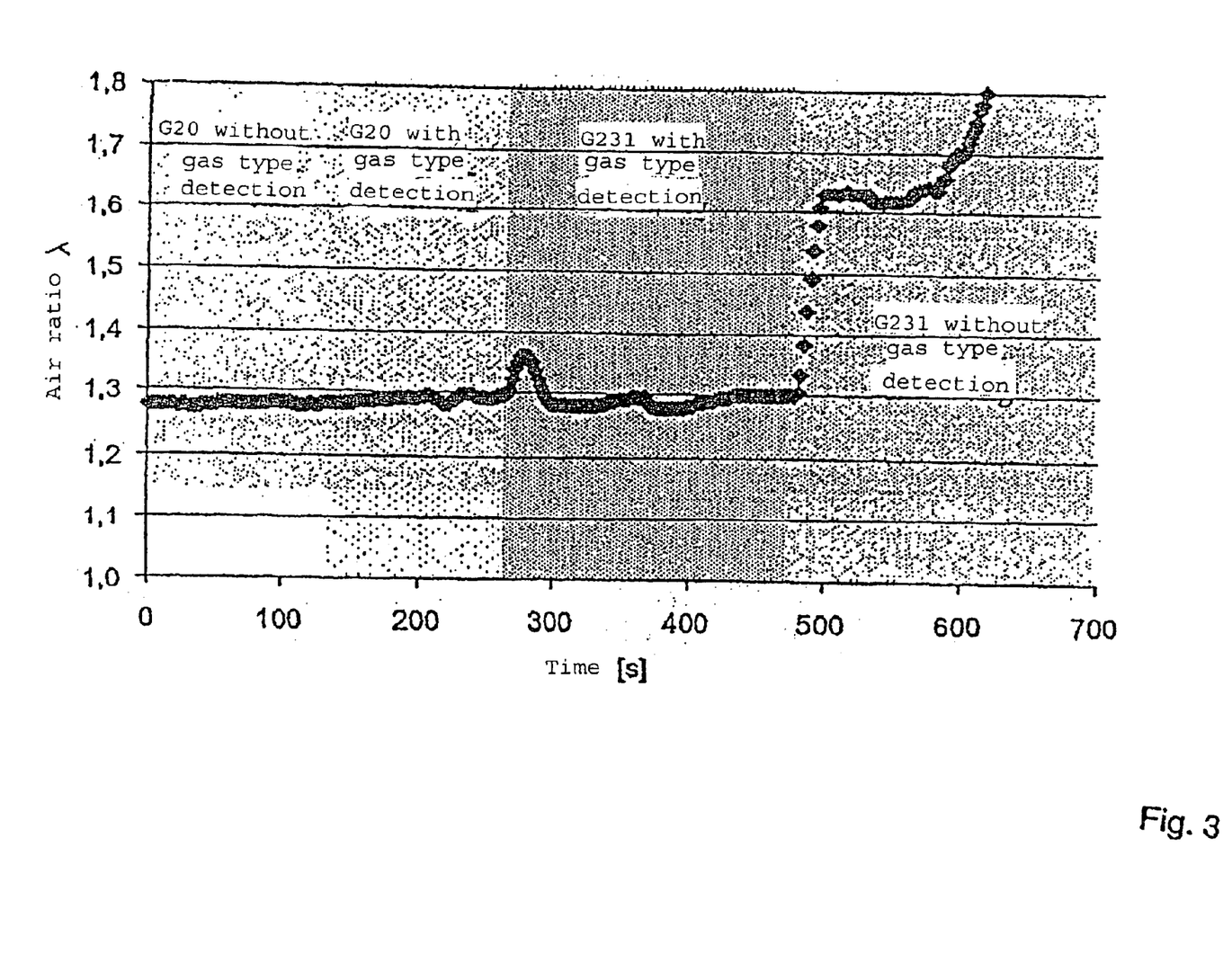
FIG. 3 The air ratio λ shown over the time for various operating conditions.

In FIG. 3 the air ratio λ is shown with the time. As a comparison, a burner is shown which is operated with and without a device provided by the invention with a change of gas type from G 20 to G 23. If the device provided by the invention is not used, the air ratio λ increases to the point where a flame in the burner is extinguished when the gas type changes to G 23.

Figure 4A:
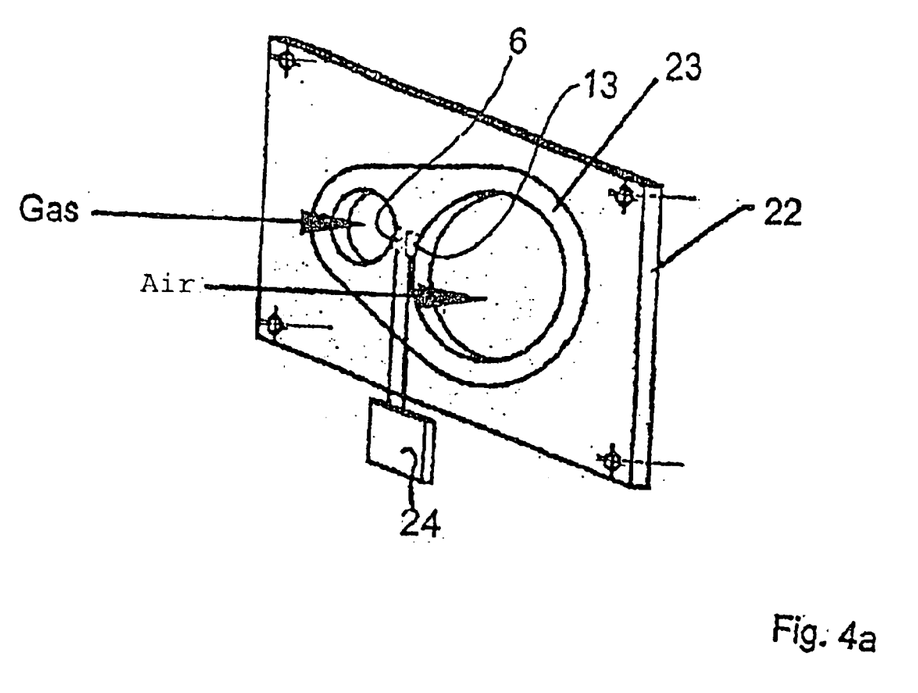
FIGS. 4a to c Schematic components of a control and regulating device provided by the invention, FIG. 5 A schematic sectional presentation of a first blower, FIG. 6 A schematic sectional presentation of a second blower, FIG. 7 A schematic sectional presentation of a third blower, FIG. 8 A schematic sectional presentation of a fourth blower, FIG. 9 A schematic view of the top of a blower with a gas feeder on the air outlet, FIG. 10 A schematic view of a first device for measurement of the viscosity of gas, FIG. 11 A schematic view of a second device for measurement of the viscosity of gas, and FIG. 12 A schematic view of a third device for measurement of the viscosity of gas.
Figure 4B:
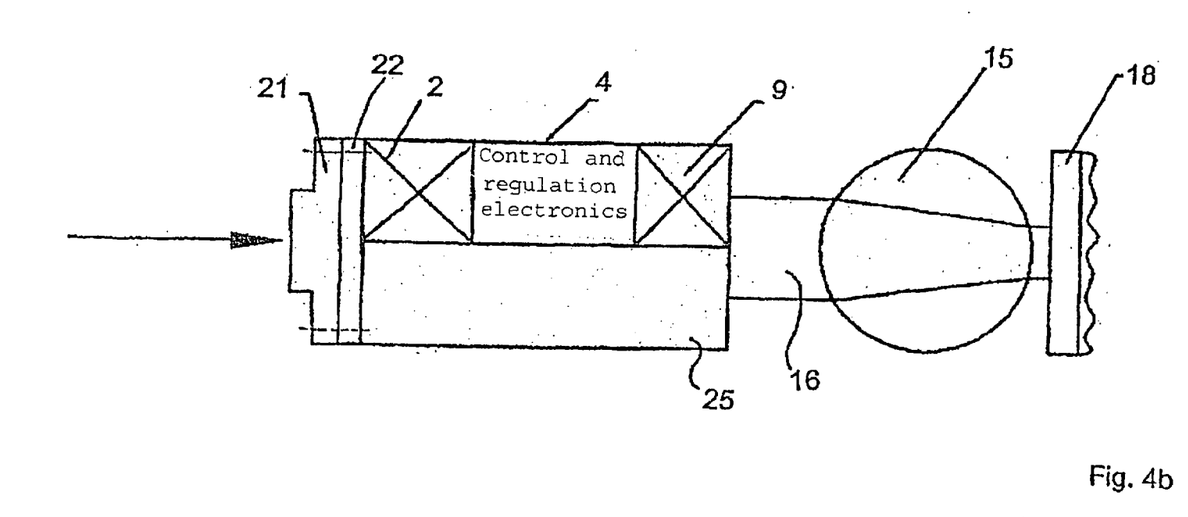

FIGS. 4a to c show a schematic view of a control and regulation device provided by the invention. An inlet plate 21 is equipped with connections for the gas and air feeder lines. An intermediate plate 22 (shown in more detail in FIG. 4a) is located downcurrent from the inlet plate 21. The intermediate plate 22 has breakthroughs through which the gas and air current are fed separately. The first mass current sensor 6 is located in the breakthrough for the gas current and the second mass current sensor 13 is located in the breakthrough for the air current. A seal is labelled 23 and an evaluation electronics unit connected with the first 6 and the second mass current sensor 13 is labelled 24. The intermediate plate 22 is installed (gas tight) on a housing 25 for the data processing device 4 or the control and regulator electronics unit. The housing 25 contains the safety magnet valve 2 which is connected after the intermediate plate 22 and in the gas current. Installed downcurrent thereto and connected in the gas current is the dosing valve 9. A device 5 (not shown here) for measuring the viscosity of the gas can be installed between the safety magnet valve 2 and the dosing valve 9. However, the device 5 can also be part of the intermediate plate 22. The device shown in FIG. 4b is suitable for blower-supported burners 18. The blower 15 is connected in a gas/air mixture line 16 leading away from the housing 25 of the device. Control of the mass current of the air takes place here via control of the capacity of blower 15.

Figure 4C:
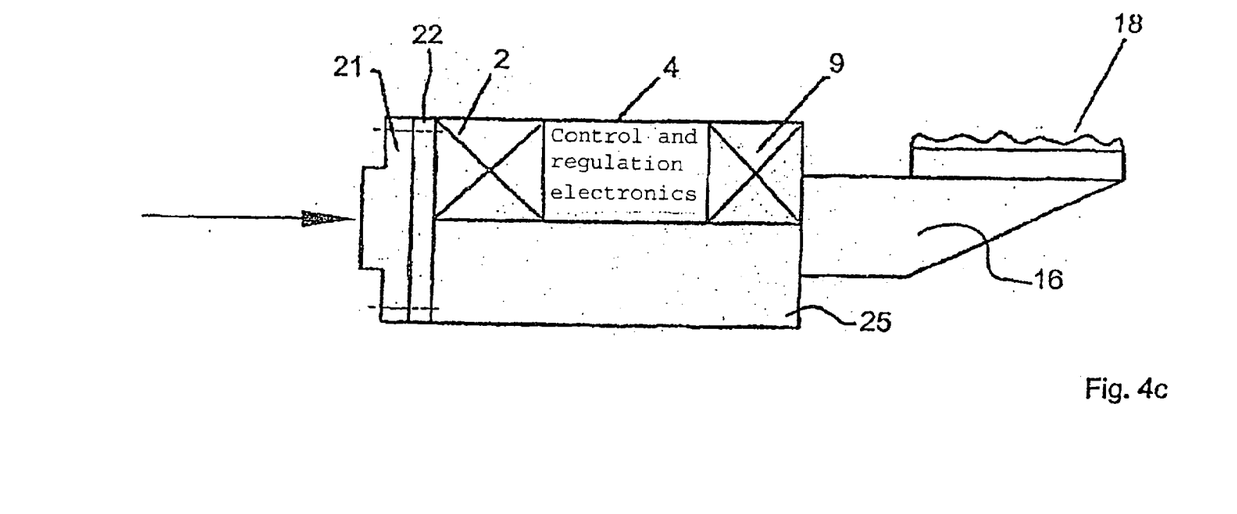

The device shown in FIG. 4c is suitable for setting the air ratio of an atmospheric burner 18. In this case, no blower is connected in the gas/air mixture line 16. A further dosing valve (not shown here) with which the mass current of the air can be controlled is installed in the housing for control of the mass current of the air.

Figures 5, 6:
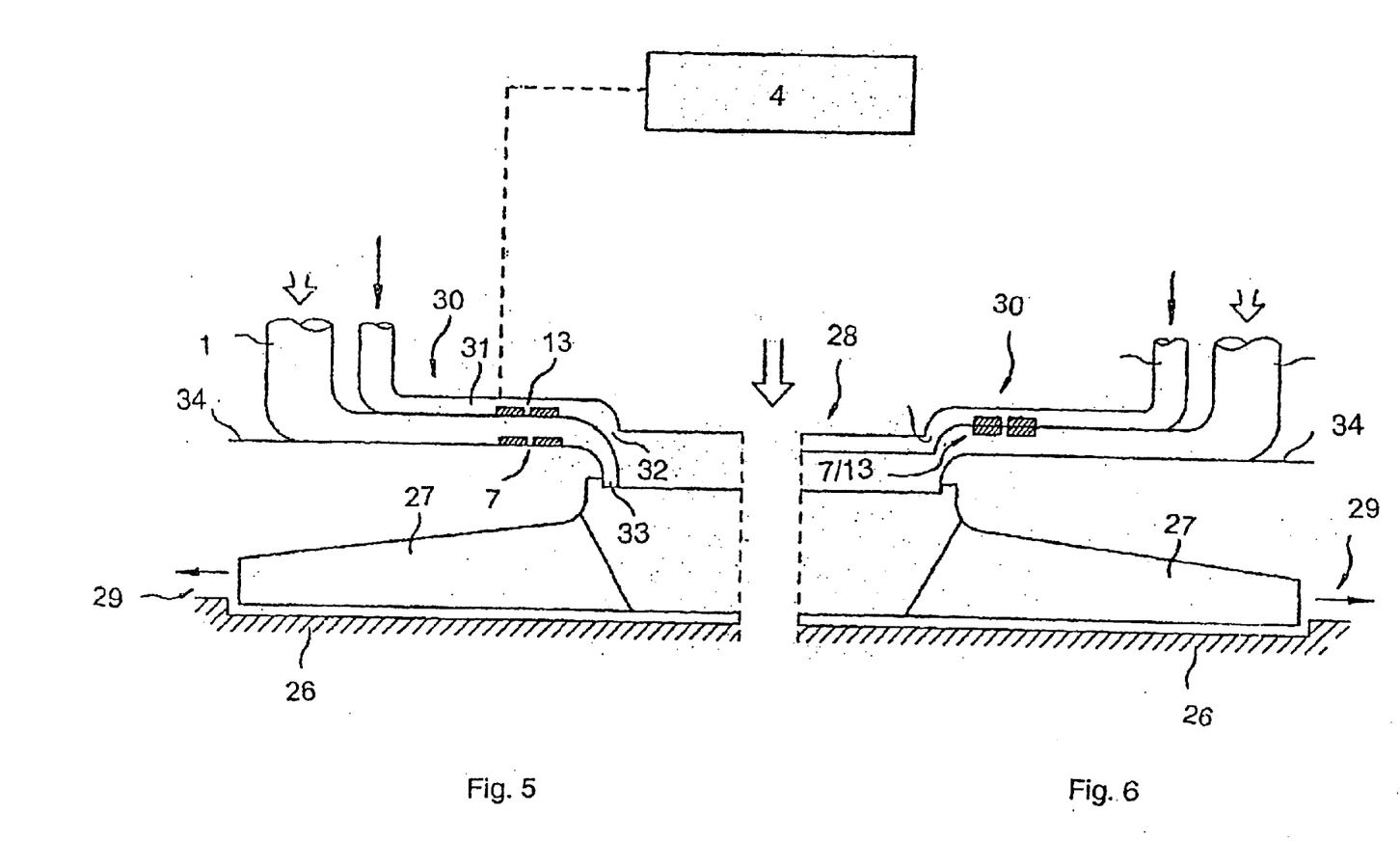

FIG. 5 shows an example of an additional blower for combustion air as it is used in so-called wall/floor furnaces. The additional blower is composed of a fan housing 26 and a fan wheel 27 with an air inlet 28 and an air outlet 29. The air inlet 28 is the suction side of the blower while the air outlet 29 is the pressure side. In the example of the invention shown in FIG. 5, the gas feeder line is again labelled with the reference designation 1. The second mass current sensor 13 which is used to determine the air mass current is located on air input 28. The second mass current sensor 13 sends signals to a controller-regulator unit or data processing device 4 which controls the combustion, e.g., sets the relationship between combustion medium and combustion air in dependence on the desired heating capacity. The second mass current sensor 13 can be an electronic air mass current anemometer as can be procured through conventional sources.

A ring jet arrangement 30 is located on air inlet 28 wherein the second mass current sensor 13 is mounted to this ring jet arrangement 30. The second mass current sensor 13 is located in a bypass 31 as shown in the example in FIG. 1 which opens in the jet gap 32 of the ring jet arrangement 30.

As shown in the example, the ring jet arrangement 30 has a further jet gap 33 (gas jet gap) to feed in the gas in addition to jet gap 32 for air mass measurement.

The first mass current sensor 7 is located in a further jet gap 33 which sends signals to the data processing device 4 with respect to the mass current of the combustion gas.

The data processing device 4 uses the signals of the air mass current and those of the gas mass current to calculate the appropriate variables to achieve the respective desired values if these deviate from the actual values.

The ring jet arrangement 30 is an integral part of a housing wall 34 of the blower. The housing wall 34 can be part of the ring jet for the combustion gas. The ring jet arrangement 30 surrounds the main current of the combustion air in the shape of a ring on air inlet 28. A homogenous mixture of combustion gas and main air current is achieved by this.

While the mass current sensors 7, 13 are installed in separate components in the applicable lines or ring jet sections as shown in the example in FIG. 5, the mass current sensors 7, 13 shown in the example in FIG. 6 are designed so that there is a common separating wall between the ring jet for the air mass measuring current and the gas current created by a measuring chip. This creates a compact unit.

Figure 7:
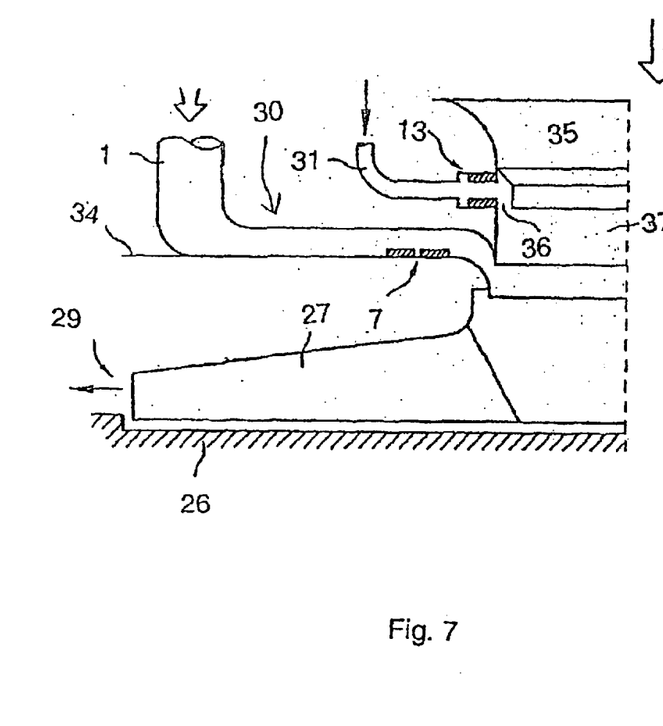

FIG. 7 shows a further example of a blower. An input canal 35 is located in front of the ring jet arrangement 30. With this formation, the second mass current sensor 13 for the air mass current is located in bypass 31 which empties into input canal 35. Inside input canal 35 is a covered ring canal 37 in front of a ring gap 36 into which canal the bypass 31 empties. The ring-shaped suctioning achieves a homogenous suction of the mass current measuring volume through bypass 31.

Figure 8:
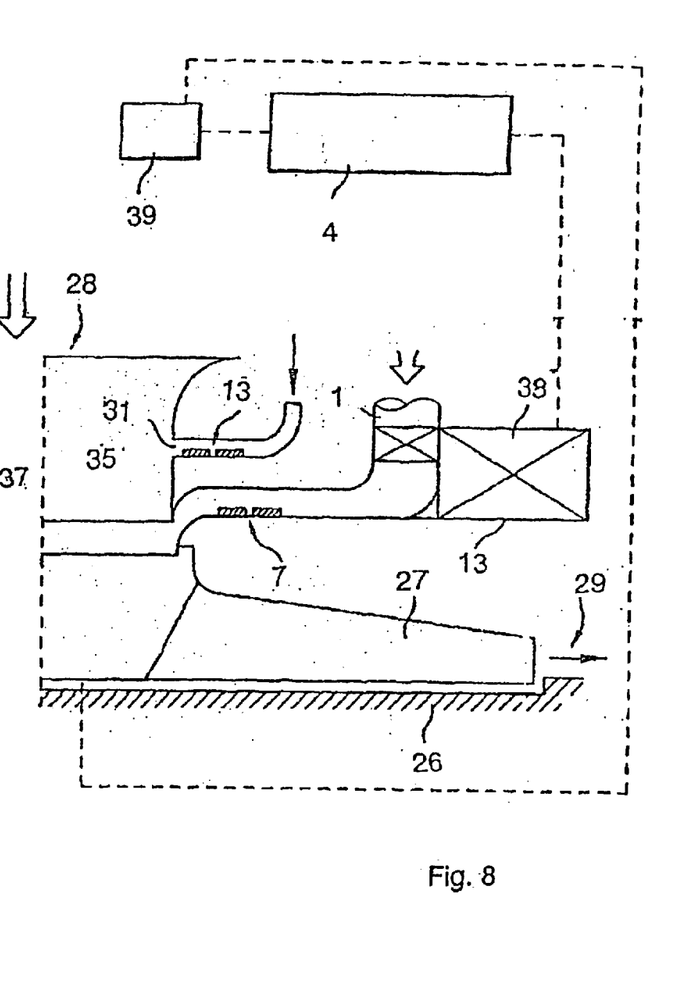

In the example shown in FIG. 8, bypass 31 is designed so that its opening is primarily pointing vertically to the wall of input canal 35.

FIG. 8 shows an example of a rotary valve/regulator valve 38 as can be used for all other versions and which is activated by data processing unit 4. The rotary valve/regulator valve 38 is an integral part of the blower. With the formation shown, the rotary valve/regulator valve 38 is designed for the gas feed-in on the suction side of the blower.

As an example for all other versions, FIG. 8 shows the motor 39 of the blower, wherein the data processing device 4 handles the mass current evaluation together with the electronic motor commutation and the speed of the blower motor can be regulated by this. The control electronics are designed so that either the gas feed-in is regulated at constant speed of the motor 39 or both the speed of the motor and the gas feed-in can be regulated appropriately with a continuous set-point/actual value comparison of the desired capacity.

Figure 9:
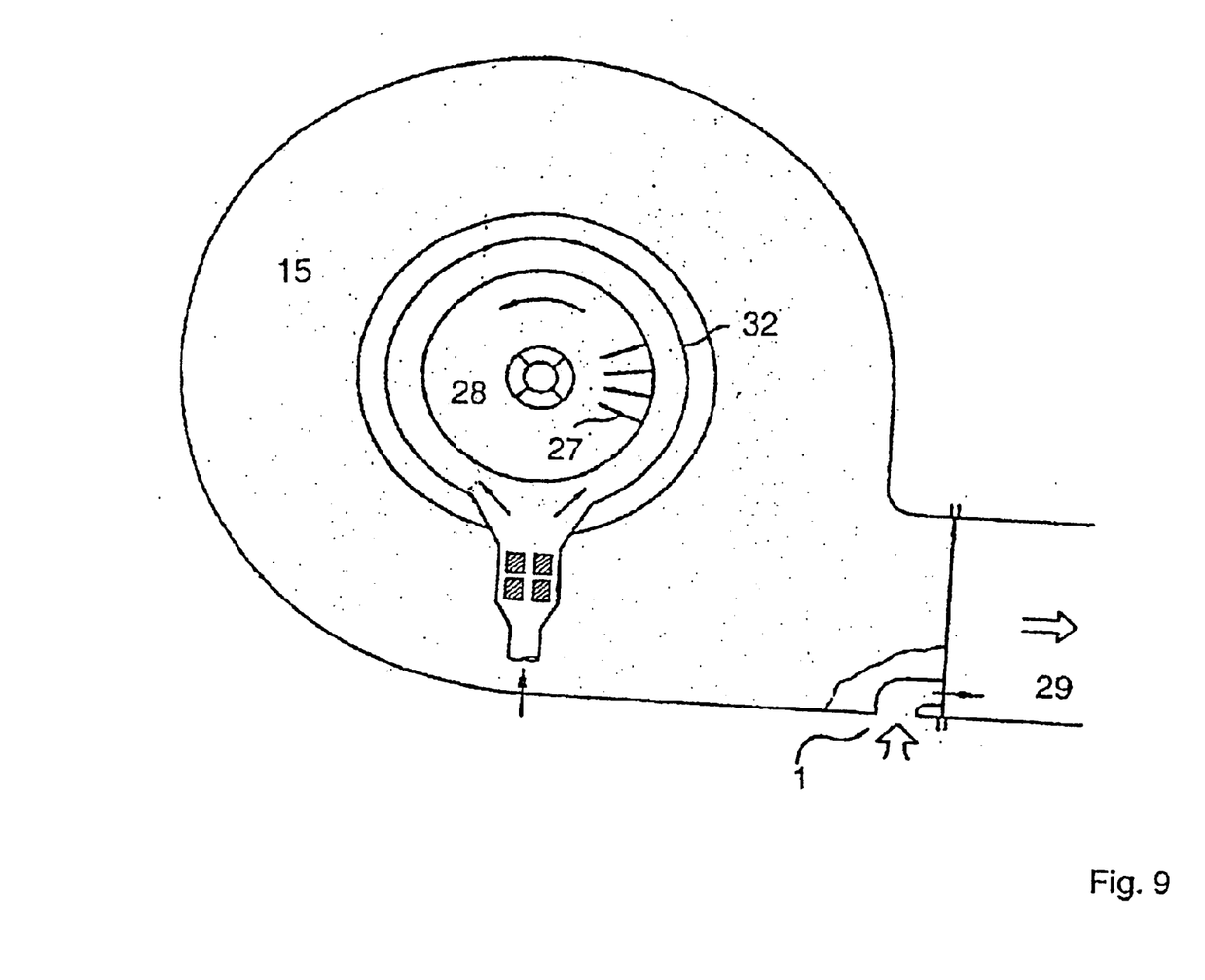

FIG. 9 shows a side view of a formation provided by the invention in which the gas feed-in 1 does not take place via a ring jet on the air inlet but in the vicinity of the pressure side on the air outlet.

The invention is not restricted to the aforementioned preferable examples. Instead a number of versions is conceivable which can make use of the presented solutions even if the models are fundamentally different.

Figure 10:
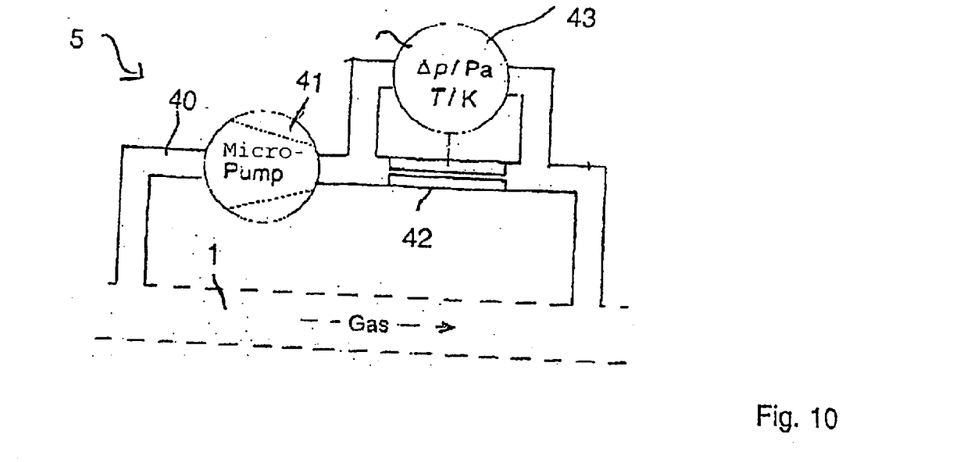
Figure 11:
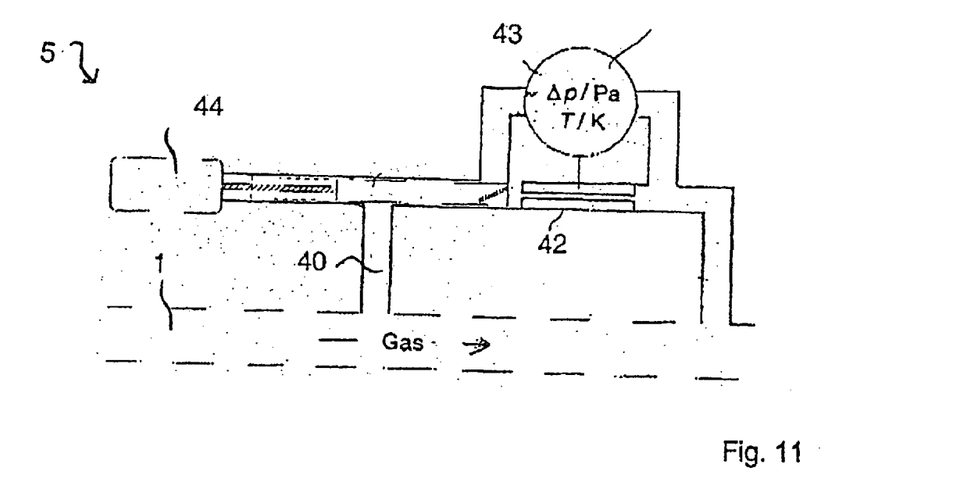
Figure 12:
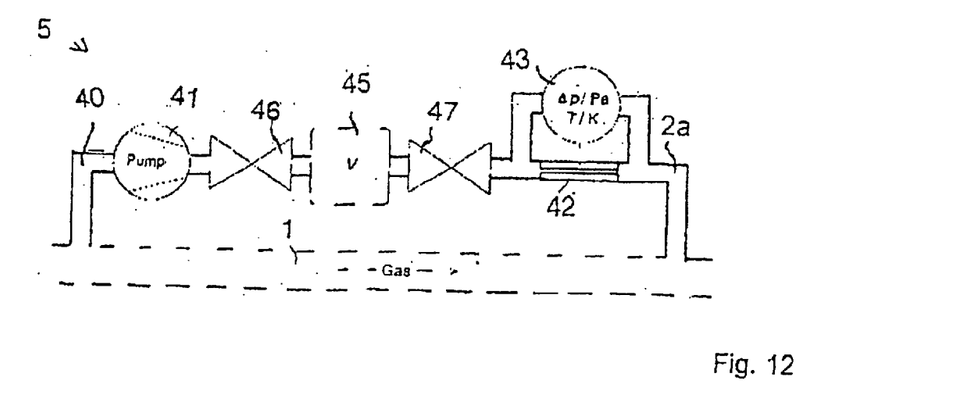

FIGS. 10 to 12 show a schematic view of different examples of devices 5 for measuring the viscosity.

The device 5 shown in FIG. 10 permits continuous measurement of the viscosity of the gas. A further bypass 40 branches off from a gas feeder line 1. A micro-pump 41 is connected in the further bypass 40. Downcurrent is a capillary 42 as well as a pressure measuring device 43. Using the micro-pump 41, a constant volume current V is pumped through the capillary 42. Using the pressure measurement device, the pressure drop is measured via capillary 42. At the same time, the temperature of the capillary is determined. Pressure measurement device 43 may include a thermo element, for instance, for this. The measured values can then be used to determine the dynamic viscosity of the gas using the Hagen-Poiseuille equation.

Device 5 shown in FIG. 11 permits a discontinuous measurement of the dynamic viscosity. A piston pump 44 is connected in bypass 40. After a the first version of the measurement with piston pump 44, a gas sample taken via bypass 40 is pressed for a certain amount of time through the capillary 42 at a constant volume current via piston pump 44. The pressure difference via the capillary is measured with the pressure measurement device 43. As with the device in FIG. 10, the dynamic viscosity of the gas can be determined from this. In a second version, the speed of piston pump 44 is increased until a pressure difference is reached via the capillary 42 at which the measuring error of the pressure measurement device 43 is particularly low. At this time, the feeder speed of the piston pump 44 is determined. The dynamic viscosity of the gas is then determined from this.

With the additional device 5 shown in FIG. 12, the measurement of the dynamic viscosity is based on a known volume. A gas sample is taken via bypass 40 and pumped into a chamber 45 by the micro-pump 41. While the chamber 45 is being filled, a first-valve 46 is opened and a second valve 47 is closed. As soon as chamber 45 is filled, the first valve 46 is also closed. The second valve 47 is then opened. The gas flows through the capillaries 42 until the pressure in chamber 45 equals the pressure in the gas feeder line 1. The pressure measurement device 43 is used to measure the speed of the drop in pressure. The dynamic viscosity can be determined from this.

REFERENCE DESIGNATION LIST

1 Gas feeder line
2 Shutoff valve
3 First control line
4 Data processing device
5 Device for measuring the viscosity
6 First measuring line
7 First mass current sensor
8 Second measuring line
9 First dosing valve
10 Second control line
11 Branching point
12 Air feeder line
13 Second mass current sensor
14 Third measuring line
15 Blower
16 Gas/air mixture line
17 Third control line
18 Burner
19 Ignition device
20 Fourth control line
21 Inlet plate
22 Intermediate plate
23 Seal
24 Evaluation electronics
25 Housing
26 Fan housing
27 Fan wheel
28 Air inlet
29 Air outlet
30 Ring jet arrangement
31 Bypass
32 Jet gap
33 Additional jet gap
34 Housing wall
35 Input canal
36 Ring gap
37 Ring canal
38 Rotary valve/regulator valve
39 Motor
40 Additional bypass
41 Micro-pump
42 Capillary
43 Pressure measurement device
44 Piston pump
45 Chamber
46 First valve
47 Second valve

What is claimed is:

1. A method of setting the air ratio λ of a fuel/air mixture made from a gaseous fuel and air for operation of a burner (18), comprising the steps of:
    a) determining a mass current of the fuel as a first measured value,
    b) determining a value for determination of the Wobbe index of the fuel as a second measured value, wherein the step of determining the second measured value comprises determining a viscosity of the fuel by guiding a part of the fuel through a capillary and by measuring a pressure drop or a speed of a pressure drop caused by the capillary,
    c) determining a mass current of the air as a third measured value, and
    d) controlling the mass current of the air and/or the fuel in dependence on at least two of the measured values so that a specified air ratio λ of the fuel/air mixture is set.

2. The method as defined in claim 1, wherein the control of the mass current of the air takes place with step d) in dependence on the measured values.

3. The method as defined in claim 1, wherein the measured values are sent to a data processing device (4), processed in accordance with a specified algorithm, and, via the data processing device (4), the mass current of the fuel is regulated with a first dosing valve (9, 38) connected in the fuel current.

4. The method as defined in claim 3, wherein the mass current of the air is controlled via a blower (15), an air valve, and/or a second dosing valve.

5. The method as defined in claim 1, wherein the air ratio λ is regulated in dependence on a stability of a flame generated in the burner (18).

6. The method as defined in claim 1, wherein the air ratio λ is regulated in dependence on a specified heating capacity of the burner (18).

7. The method as defined in claim 1, wherein the air ratio λ is regulated so that emissions created during combustion are minimal.

8. The method as defined in claim 1, wherein a mass current of the fuel is regulated based upon the first and second measured value so that a specified heat value of the fuel fed to the burner (18) per time unit is held primarily constant.

9. The method as defined in claim 1, wherein a viscosity of the fuel or a function of the viscosity is determined as the second measured value.

10. A device for performing the method of claim 1, comprising:
a first mass current sensor for the determination of a first measured value, a device (5) for measuring the second measured value for the determination of the Wobbe index, the device (5) comprising a capillary (42) and a pressure measurement device (43) to measure one of: a pressure drop and the speed of a pressure drop caused by the capillary, and a first dosing valve (9), said first mass current sensor, said device, and said first dosing valve being connected a fuel feeder line (1),
a second mass current sensor (13), said second mass current sensor being connected in an air feeder line (12, 28) for the determination of a third measured value,
means (15) for controlling the mass current of the air,
a data processing device (4) for regulation of the mass current of the fuel via the first dosing valve (9), wherein the mass current of the fuel is regulated in dependence on the first and second measured value so that a specified heat value of the fuel fed to the burner (18) per time unit is held primarily constant, and
wherein the mass current of the air is controlled by the data processing device (4) in dependence on at least two of the measured values so that a specified air ratio λ can be set.

11. The device as defined in claim 10, wherein the mass current of the air can be controlled in dependence on the measured values.

12. The device as defined in claim 10, wherein the device (5) for measuring the second measured value is a device for measuring a viscosity or a function of the viscosity.

13. The device as defined in claim 10, wherein the means for regulating the mass current is equipped with a blower (15), an air valve, and/or a second dosing valve.

14. The device as defined in claim 10, wherein a device is provided for recognition of a stability of a flame generated in the burner, and wherein the air ratio λ can be regulated via the data processing device (4) in dependence on a fourth measured value measured by the device.

15. The device as defined in claim 10, wherein a device is provided for measuring a capacity of the burner (18), and wherein the air ratio λ can be regulated via the data processing device (4) in dependence on a fifth measured value measured by the device.

16. The device as defined in claim 10, wherein a device is provided for measuring a pollution content of emissions, and wherein the air ratio λ can be regulated via the data processing device (4) in dependence on a sixth measured value measured by the device so that the pollution content created by the combustion is minimal.

17. The device as defined in claim 10, wherein a blower is provided for air in a wall/floor furnace, with a blower housing (26), and blower wheel (27), with an air inlet (28) and an air outlet (29), and with a fuel feeder line (1) for the fuel, wherein the second mass current sensor (13) for determining the air mass current is located on the air inlet (28), which is functionally connected with a data processing device (4) and sends signals to said data processing device for calculation of a ratio of combustion medium to combustion air in dependence on a desired heating capacity.

18. The device as defined in claim 10, wherein the second mass current sensor (13) is an electronic air mass current anemometer.

19. The device as defined in claim 10, wherein a ring jet arrangement (30) is located on the air inlet (28).

20. The device as defined in claim 19, wherein the second mass current sensor (13) is located on the ring jet arrangement (30).

21. The device as defined in claim 20, wherein the second mass current sensor (13) is located in a bypass (31) which empties into a jet gap (32) of the ring jet arrangement (30).

22. The device as defined in claim 21, wherein the ring jet arrangement (30) has a further jet gap (33) for the feeding in of fuel in addition to the jet gap (32) for the air mass measurement.

23. The device as defined in claim 22, wherein a first mass current sensor (7) is located in the area of the further jet gap (33) which sends appropriate signals to the data processing device (4).

24. The device as defined in claim 19, wherein the ring jet arrangement (30) is an integral part of the housing wall (34) on the air inlet (28) of the blower.

25. The device as defined in claim 19, wherein the ring jet arrangement (30) surrounds a main current of the combustion air on the air inlet (28).

26. The device as defined in claim 19, wherein the ring jet arrangement (30) is preceded by an input canal (35).

27. The device as defined in claim 26, wherein the bypass (31) empties into the input canal (35).

28. The device as defined in claim 27, wherein the bypass (31) empties into a ring gap (36) inside the input canal (35).

29. The device as defined in claim 10, wherein a rotary valve/regulator valve (38) for the gas feed-in is an integral part of the housing.

30. The device as defined in claim 29, wherein the rotary valve/regulator valve (38) for the gas feed-in is located on the suction side of the blower.

31. The device as defined in claim 10, wherein an electronic motor commutation handles a mass current evaluation and regulates a speed of a blower motor.

32. The device as defined in claim 10, wherein the electronic motor commutation handles mass current evaluation and regulates a speed of a blower motor and the gas feed-in.

* * * * *